United States Patent [19]
Kuriyama

[11] Patent Number: 5,113,055
[45] Date of Patent: May 12, 1992

[54] LASER BEAM OPTICAL SYSTEM AND LASER BEAM MACHINING METHOD USING THE SAME

[75] Inventor: Katsuhiro Kuriyama, Takarazuka, Japan

[73] Assignee: Matsushita Electric Industrial Co., Ltd., Osaka, Japan

[21] Appl. No.: 602,093

[22] Filed: Oct. 25, 1990

[30] Foreign Application Priority Data

Oct. 25, 1989 [JP] Japan .................................. 1-278858

[51] Int. Cl.⁵ .......................................... B23K 26/00
[52] U.S. Cl. .......................... 219/121.67; 219/121.72; 219/121.74; 219/121.77
[58] Field of Search ...................... 219/121.77, 121.74, 219/121.78, 121.79

[56] References Cited

U.S. PATENT DOCUMENTS

| | | | |
|---|---|---|---|
| 3,256,524 | 6/1966 | Stauffer | 219/121.77 X |
| 3,997,964 | 12/1976 | Holbrook et al. | 219/121.69 X |
| 4,118,619 | 10/1978 | McArthur et al. | 219/121.77 X |
| 4,410,785 | 10/1983 | Lilly, Jr. et al. | 219/121.77 X |
| 4,701,591 | 10/1987 | Masaki et al. | 219/121.79 X |

Primary Examiner—C. L. Albritton
Attorney, Agent, or Firm—Wenderoth, Lind & Ponack

[57] ABSTRACT

A laser beam optical system has a plurality of beam reflectors having respective reflecting faces and spacedly supported for rotation in one direction about a common axis which is either in alignment with or parallel to the path of travel of a laser beam emitted from a single beam oscillator. Each of the reflectors is also supported on a common drive shaft with the respective reflecting face inclined at a predetermined angle relative to the drive shaft so that the laser beam can impinge thereupon at an angle of incidence of 45°. Those reflectors on the common drive shaft are so coordinated with each other that the reflectors can selectively deflect the laser beam, emitted from the single beam oscillator, towards corresponding condenser lenses during the rotation of the reflectors together with the drive shaft.

3 Claims, 1 Drawing Sheet

LASER BEAM OPTICAL SYSTEM AND LASER BEAM MACHINING METHOD USING THE SAME

BACKGROUND OF THE INVENTION

1. Field of the Invention

The present invention relates to an optical system in a laser beam machining device of a type used to cut the workpiece intermittently and also to a laser beam machining method using the laser beam machining device.

2. Description of the Prior Art

In general, lead or lead alloy used in, for example, lead electrodes for a lead storage battery is low in hardness, but high in viscosity. When it comes to the cutting of metal having a low hardness and a high viscosity, the use of a shearing technique often result in the formation of burrs in the cut face of the metal. On the other hand, where a laser cutting technique is employed, the metal can be precisely cut at an increased cutting speed with little loss of material and with no substantial formation of burrs on the cut face.

In the practice of the laser cutting technique, a laser beam emitted from a laser oscillator is condensed by a condenser lens so as to converge at a point where a nozzle is positioned for blowing an assist gas to facilitate cutting. If the assist gas employed is oxygen, oxidation of the metal in contact with the oxygen can be effectively utilized to facilitate the metal cutting and, therefore, the power of the laser may be reduced to only a fraction of the laser power necessitated when only the laser beam is used with no assist gas employed. Specifically, at an initial stage of the laser cutting, fusion of the metal requires a relatively large quantity of energy in the laser beam. However, once the metal is heated to a predetermined temperature equal to or higher than the melting point, in an extreme case, the blow of oxygen would suffice to accomplish the cutting with no laser beam radiation needed. Also, the oxygen so blown onto the metal is effective to remove molten metal to facilitate the continued cutting.

In view of the foregoing, it is a general notion that, when it comes to the cutting of a metal by the use of the laser beam, the combined use with the laser an beam of energy density sufficient to cause the workpiece to be heated to a required temperature with oxygen as the assist gas is preferred at the initial stage of cutting.

Reference to FIG. 2 of the accompanying drawings will now be made for a detailed discussion of the prior art laser cutting method as applied to the laser beam cutting of a workpiece into a plurality of generally rectangular pieces such as, for example, lead electrodes used in a lead storage battery, with discontinuous radiation of a laser beam. As shown, referring to FIG. 2, reference numeral 17 designates a generally grid-patterned sheet of lead electrodes for use in a lead storage battery; reference numerals 18, 19, 20 and 21 designate respective condenser lenses positioned in the vicinity of associated cutting portions; and reference numerals 22, 23, 24 and 25 represent respective cutting nozzles positioned in alignment with the corresponding condenser lenses 18 to 21 for supplying an assist gas therethrough towards the lead electrode 17 sheet. Reference numerals 26, 27, 28 and 29 designate respective beam oscillators for emitting laser beams therefrom, which beams are subsequently deflected by associated deflecting mirrors 30, 31, 32 and 33 so as to travel towards the corresponding condenser lenses 18 to 21. When all four beam oscillators 26 to 29 are excited simultaneouly, laser beam cutting at four locations can be accomplished.

The prior art laser beam cutting method discussed above has a problem in that, if the laser beams are continuously radiated towards portions of the sheet being cut which are not required to be cut by the laser beam, i.e. cut by the oxygen blowing, the laser beams tend to be used unnecessarily. Also, the prior art laser beam cutting method requires the use of a number of beam oscillators equal to the number of cutting lines along which cutting is desired to be made, the apparatus as a whole tends to become bulky in size and expensive.

SUMMARY OF THE INVENTION

The present invention has been devised with a view to substantially eliminating the above discussed problems inherent in the prior art laser beam cutting system and has for its essential object to provide an improved optical system used in a laser beam machining device wherein only one laser beam oscillator is used for cutting a grid-patterned workpiece along a plurality of cutting portions or lines discontinuously.

Another important object of the present invention is to provide an improved laser beam machining method which can be practised with the use of the laser beam machining device referred to above.

In order to accomplish the above described objects of the present invention, the laser beam optical system herein disclosed comprises a plurality of reflectors having respective flat reflecting faces and spacedly supported for rotation in one direction about a common axis which is either in alignment with or parallel to the path of travel of a laser beam emitted from a single beam oscillator. Each of the reflectors is also supported on a common drive shaft with the respective reflecting face inclined at a predetermined angle relative to the drive shaft so that the laser beam can impinge thereupon at an angle of incidence of 45°. Those reflectors on the common drive shaft are so coordinated with each other that the reflectors can selectively deflect the laser beam, emitted from the single beam oscillator, towards respective ones of the condenser lenses during the rotation of the reflectors together with the drive shaft.

The laser beam machining method herein disclosed according to the present invention is characterized in that a grid-patterned workpiece is discontinuously cut by the single laser beam oscillator.

Thus, according to the present invention, the optical system is effective to selectively divide the laser beam from the single laser beam oscillator on a time sequence basis into beam components equal to the number of cutting portions or lines and, therefore, the number of laser beam oscillators, which has hitherto been required to be equal to the number of the cutting portions or lines, can be advantageously reduced.

BRIEF DESCRIPTION OF THE DRAWINGS

These and other objects and features of the present invention will become clear from the following description of a preferred embodiment thereof with reference to the accompanying drawings, in which.

DETAILED DESCRIPTION OF THE EMBODIMENT

Figure 1:
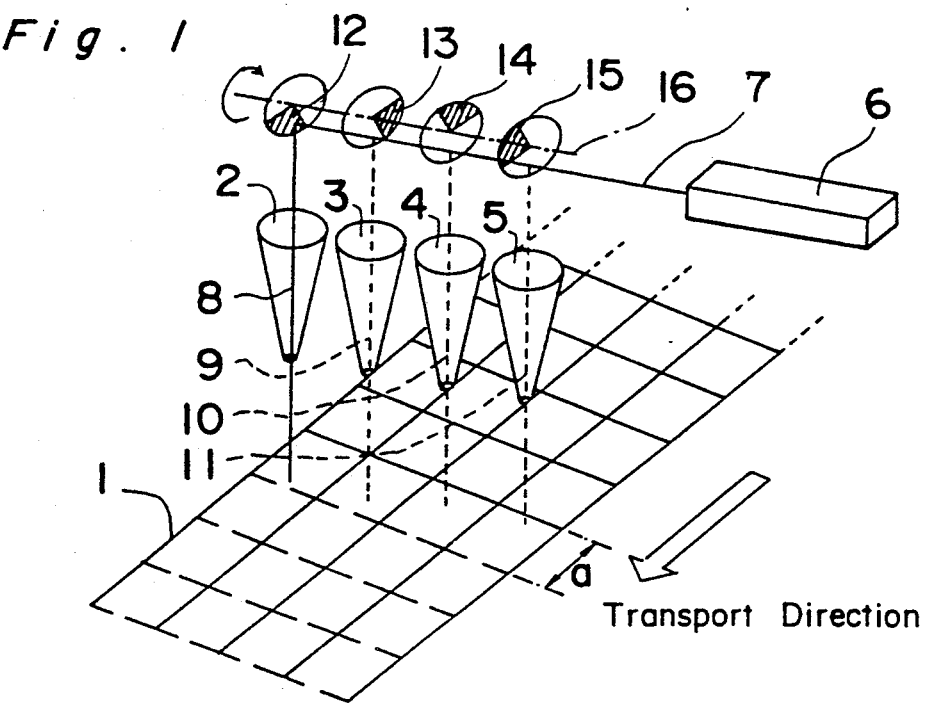
FIG. 1 is a schematic diagram showing a laser beam optical system according to the present invention.

Referring now to FIG. 1, there is shown an example wherein a workpiece is desired to be cut along four cutting lines by the use of a single laser beam oscillator according to the present invention.

In FIG. 1, reference numeral 1 designates a grid-patterned lead electrode sheet from which electrodes for use in a lead storage battery are to be cut. Let it be assumed that this lead electrode sheet is desired to be cut along four cutting lines parallel to the direction of transport of the lead electrode, into a plurality of generally rectangular electrode pieces, each of the neighboring electrode pieces having the ends spaced from each other in the direction of cutting a distance a which is equal to or smaller than one fourth of the length of the lead electrode being cut as measured.

Figure 2:
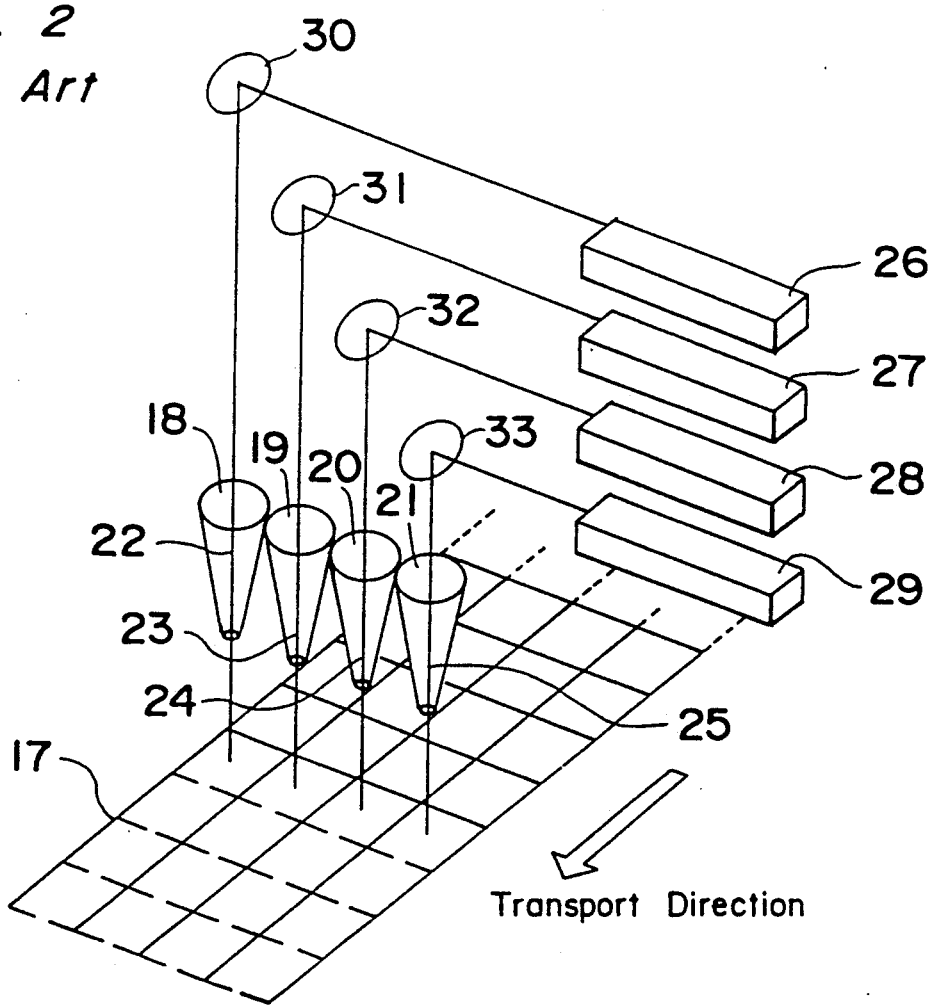
FIG. 2 is a schematic diagram showing a prior art laser beam optical system.

Reference numerals 2, 3, 4 and 5 designate respective condenser lenses arranged at an angle across the electrode sheet. The condenser lens 3 is disposed at a position displaced laterally of the sheet a distance equal to the width of the electrode and a distance of a/4 from the condenser lens 2 in a direction counter to the direction of cutting of the lead electrode 1; the condenser lens 4 is disposed at a position displaced laterally a distance equal to the electrode width and a distance of a/4 from the condenser lens 3 in a direction counter to the cutting direction; and the condenser lens 5 is disposed at a position displaced laterally a distance equal to the electrode width and a distance of a/4 from the condenser lens 4 in a direction counter to the cutting direction. Reference numeral 6 designates a laser beam oscillator for emitting a laser beam 7 in a direction perpendicular to each of optical axes 8, 9, 10 and 11 passing through the respective condenser lenses 2 to 5. Reference numerals 2a, 3a, 4a, and 5a designate nozzles corresponding to the nozzles 22-25 of FIG. 2.

Reference numerals 12, 13, 14 and 15 designates respective beam reflectors mounted on a common drive shaft 16 extending parallel to the direction in which the laser beam oscillator 6 emits the laser beam 7, each of said reflectors having a reflecting face inclined 45° relative to the direction of incidence of the laser beam 7 from the laser beam oscillator 6. The reflecting face of each of the beam reflectors 12 to 15 is operable to deflect the laser beam 7 towards a corresponding one of the associated condenser lenses 2-5. As illustrated, each of the beam reflectors 12 to 15 is in the form of a transparent glass disc having a sector portion formed into a mirror face which acts as the reflecting face, while the remainder is left transparent. The sector portion referred to above corresponds to one fourth of the total surface area of the respective disc-shaped reflectors, having a 90° apex adjacent the drive shaft 16, as indicated by the hatched area. Also, the beam reflectors 12 to 15 mounted on the drive shaft 16 for rotation together therewith are so arranged and so positioned relative to each other that the sector-shaped reflecting face of one of the beam reflectors 12 to 15 is offset 90° from that of the neighboring beam reflector with respect to the direction of rotation of the drive shaft 16. Alternatively, each of the beam reflectors 12 to 15 may be employed in the form of a generally sector-shaped mirror.

In the practice of a laser beam cutting method according to the present invention, the lead electrode sheet 1 is transported in the direction shown by the arrow. Although not shown, the drive shaft 16 carrying the beam reflectors 12 to 15 is driven so as to undergo a complete rotation during each period in which the lead electrode sheet 1 is moved a distance equal to the distance a. At this time, the laser beam 7 is emitted from the laser beam oscillator 6 towards successive ones of the beam reflectors 12 to 15 which is then brought in position to reflect the incoming laser beam 7 towards the associated condenser lens 2 to 5. Thus, by driving the drive shaft 16 so that each one of the cutting portions or lines on the lead electrode 1 can be radiated with the laser beam 7 that has been reflected from the associated beam reflector 12 to 15, the cutting lines between lead electrodes 1 can be discontinuously cut a length a/4 by the laser beams at all four cutting portions or lines successively. For cutting the remainder of the length, cutting by oxygen blowing through the nozzles 2a-5a is carried out.

In the foregoing description, each of the beam reflectors 12 to 15 has been described and shown as inclined 45° relative to the incoming laser beam 7. The angle of inclination of 45° is chosen to avoid any possible variation in distribution of the power density of the laser beam. Where no distribution of the power density of the laser beam will affect the machining or cutting, the angle of inclination of each beam reflector need not be limited to 45°.

In place of the beam reflectors 12 to 15 of the construction shown in and described with reference to FIG. 1, a four-division beam splitter could be employed for dividing the laser beam into four beam components. However, in order to secure the energy of the laser beam required to accomplish cutting, the peak energy for each beam component has to be taken into consideration. In other words, where the four-division beam splitter is employed, the laser beam oscillator 6 is required to have a power four times that required for accomplishing a single cutting. In contrast thereto, the present invention is advantageous in that only one laser beam oscillator 6 having a power required to accomplish a single cutting can be employed for accomplishing multiple cuttings.

Although the present invention has been described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An apparatus for cutting a sheet of metal material along parallel cutting lines into elongated strips, comprising:

means for transporting a sheet of metal material in a transport direction;

a laser beam generator for generating a single laser beam directed transversely of a sheet of metal being transported;

a rotatable shaft parallel to said laser beam and having a plurality of rotating reflectors mounted on said shaft at distances corresponding to the spacing of cutting lines on the sheet of metal material, each reflector having a reflection surface extending around said shaft for only a portion of the circumferential distance around said shaft and the remainder of each reflector being transparent, and each reflection surface being circumferentially offset from the other reflection surfaces on said shaft and being at an angle to the angle of said shaft, and being positioned for being moved through the laser beam during each revolution of said shaft for causing said laser beam to be selectively reflected from successive reflection surfaces toward corresponding cutting lines on the sheet of metal material;

drive means for rotating said shaft through one revolution each time a length of the sheet corresponding to a desired length of a piece to be cut from the strips passes the position of the laser beam; and metal cutting gas nozzles along the respective paths of the reflected laser beam and adjacent the position of the metal sheet being transported and means for feeding a metal cutting gas to said nozzles during the time the laser beam is not being reflected along the path on which the respective nozzle is positioned.

2. An apparatus as claimed in claim 1 in which said reflectors are further spaced from each other in the direction of the transport of the metal sheet a distance equal to the desired length of a piece to be cut from the strips divided by the number of reflectors.

3. A method for machining a sheet of metal material by a single laser beam, comprising:

transporting a sheet of metal material in a transport direction;

providing a laser beam generator for generating a single laser beam and directing said single laser beam transversely of the sheet of metal being transported;

providing a rotatable shaft parallel to said laser beam and having a plurality of rotating reflectors mounted on said shaft at distances corresponding to the spacing of cutting lines on the sheet of metal material, each reflector having a reflection surface extending around said shaft for only a portion of the circumferential distance around said shaft and the remainder of each reflector being transparent, and each reflection surface being circumferentially offset from the other reflection surfaces on said shaft and being at an angle to the angle of said shaft, and rotating said shaft for moving said reflecting surfaces through the laser beam during each revolution of said shaft for causing said laser beam to be selectively reflected from successive reflection surfaces toward corresponding cutting lines on the sheet of metal material, the speed of rotation being for rotating said shaft through one revolution each time a length of the sheet corresponding to a desired length of a piece to be cut from the strips passes the position of the laser beam.

* * * * *